United States Patent
Lindén

(10) Patent No.: US 11,654,585 B2
(45) Date of Patent: May 23, 2023

(54) HAND OPERATED SHEARING TOOL

(71) Applicant: Fiskars Finland Oy Ab, Helsinki (FI)

(72) Inventor: Erkki Olavi Lindén, Billnas (FI)

(73) Assignee: Fiskars Finland Oy Ab, Espoo (FI)

( * ) Notice: Subject to any disclaimer, the term of this patent is extended or adjusted under 35 U.S.C. 154(b) by 32 days.

(21) Appl. No.: 17/263,028

(22) PCT Filed: Jun. 11, 2019

(86) PCT No.: PCT/FI2019/050449
§ 371 (c)(1),
(2) Date: Jan. 25, 2021

(87) PCT Pub. No.: WO2020/021159
PCT Pub. Date: Jan. 30, 2020

(65) Prior Publication Data
US 2021/0308883 A1 Oct. 7, 2021

(30) Foreign Application Priority Data

Jul. 27, 2018 (FI) .................................. 20185661

(51) Int. Cl.
*B26B 13/28* (2006.01)
*A01G 3/02* (2006.01)
*A01G 3/047* (2006.01)

(52) U.S. Cl.
CPC ............ *B26B 13/285* (2013.01); *A01G 3/021* (2013.01); *A01G 3/0475* (2013.01)

(58) Field of Classification Search
CPC ......... B26B 13/00; B26B 13/04; B26B 13/06; B26B 13/12; B26B 13/28; B26B 13/285; A01G 3/021

(Continued)

(56) References Cited

U.S. PATENT DOCUMENTS 1,005,661 A * 10/1911 Shirt ....................... B26B 13/04
30/260
1,100,876 A * 6/1914 Henderson .............. B26B 13/28
30/267

(Continued)

FOREIGN PATENT DOCUMENTS

CN 2832459 Y 11/2006
CN 101605637 A 7/2012

(Continued)

OTHER PUBLICATIONS

International Search Report and Written Opinion for International Application No. PCT/FI2019/050449, dated Aug. 30, 2019, 10 pages.

(Continued)

*Primary Examiner* — Jason Daniel Prone
(74) *Attorney, Agent, or Firm* — Foley & Lardner LLP

(57) ABSTRACT

A shearing tool has a first unit with a first blade, rotatably coupled to a second unit with a second blade, at a first pivot having a first pin, so that displacement of the first blade relative to the first pin in a direction parallel with a first rotational axis is prevented, and the handle is connected to the second blade so that rotational movement of the handle relative to the second blade about a second rotational axis is allowed. The second rotational axis is defined by a second pivot interacting with the second blade and the handle at a distance from the first rotational axis in a direction away from a cutting edge contact point. When the shearing tool moves from an open to a closed position, the second blade is driven towards the first blade at the contact point for increasing the cutting capacity of the shearing tool.

12 Claims, 3 Drawing Sheets

(58) Field of Classification Search
USPC ........ 30/236, 237, 250–254, 260; D8/53, 57
See application file for complete search history.

(56) References Cited

U.S. PATENT DOCUMENTS

| | | | |
|---|---|---|---|
| 2,239,851 A | | 4/1941 | Lincoln |
| 2,290,203 A | * | 7/1942 | Nikonow et al. ....... B26B 13/28 |
| | | | 30/230 |
| 2,696,045 A | | 12/1954 | Blodgett |
| 2,856,687 A | * | 10/1958 | Beckmann et al. .... B26B 13/28 |
| | | | 30/266 |
| 3,460,251 A | | 8/1969 | Somervell et al. |
| 4,074,430 A | * | 2/1978 | Sugiyama ............... B26B 13/28 |
| | | | D8/57 |
| 4,133,107 A | | 1/1979 | Vogel |
| 4,715,122 A | * | 12/1987 | Linden ................... B26B 13/28 |
| | | | 30/254 |
| 4,982,500 A | * | 1/1991 | Ramani ................. B26B 13/285 |
| | | | 30/254 |
| 5,440,813 A | * | 8/1995 | Roskam ................ B26B 13/285 |
| | | | 30/267 |
| 5,628,116 A | * | 5/1997 | Kohno ................... B26B 13/28 |
| | | | 30/267 |
| 5,689,888 A | * | 11/1997 | Linden ................... B26B 13/26 |
| | | | 30/250 |
| 5,694,694 A | | 12/1997 | Roskam |
| 7,810,242 B1 | * | 10/2010 | Lynch .................. B26B 13/285 |
| | | | 30/254 |
| D700,029 S | * | 2/2014 | Roberts ........................... D8/57 |
| 10,695,921 B2 | * | 6/2020 | Wong ..................... B26B 13/28 |
| 2015/0375385 A1 | | 12/2015 | Nix et al. |
| 2022/0126466 A1 | * | 4/2022 | Adachi ................ B26B 13/285 |

FOREIGN PATENT DOCUMENTS

| | | | | |
|---|---|---|---|---|
| CN | 102922542 A | | 2/2013 | |
| CN | 106660217 A | | 5/2017 | |
| DE | 43 02 921 | | 8/1994 | |
| DE | 29910126 U1 | | 9/1999 | |
| EP | 2 540 459 | | 1/2013 | |
| FI | 124699 | | 12/2012 | |
| GB | 0 431 240 | | 7/1935 | |
| GB | 0 431 240 A | | 7/1935 | |
| GB | 0 924 741 A | | 5/1963 | |
| JP | S5357583 | | 5/1978 | |
| JP | H08-257259 A | | 10/1996 | |
| TW | M524776 U | | 7/2016 | |
| WO | WO-2019239008 A1 | * | 12/2019 | .......... B26B 13/285 |
| WO | WO-2020021159 A1 | * | 1/2020 | .......... B26B 13/285 |

OTHER PUBLICATIONS

Search Report for Finnish Application No. 20185661, dated Feb. 25, 2019, 1 page.
Extended European Search Report for EP Application No. 19842341.0, dated Apr. 11, 2022, 5 pages.

* cited by examiner

HAND OPERATED SHEARING TOOL

CROSS-REFERENCE TO RELATED APPLICATIONS

This application claims the benefit of priority to international patent application number PCT/FI2019/050449, filed on Jun. 11, 2019, which claims the benefit of Finland patent application No. 20185661, filed on Jul. 27, 2018, the complete disclosures of which are hereby incorporated by reference for all purposes.

FIELD OF THE DISCLOSURE

The present disclosure relates to shearing tools, and particularly to hand operated shearing tools, such as scissors.

BACKGROUND OF THE DISCLOSURE

The cutting capacity of traditional scissors intended for cutting fabric, leather etc. is limited by the force keeping the blades together. When this force is not high enough, the blades are forced apart and the material to be cut will be squeezed between the blades. If the blades are rigid enough and the geometry of the insides of the blades allows, this can be overcome by tightening the blades against each other at the pivot to allow a high cutting capacity, but then the "idle" cutting force will be great and the scissors awkward to use.

Document U.S. Pat. No. 3,460,251 A discloses a hand tool such as a pair of shears comprises a pair of pivotally-connected blades, a first handle rigid with a first blade and a second handle connected to a second blade through a coupling comprising rolling elements, e.g. balls resting in recesses in the coupling parts, the coupling being effective, when the tool is cutting or shearing a piece of material, to bias the blades towards one another in a direction perpendicular to the direction of their relative movement with a force which is related to the resistance offered by the material. In one embodiment, the coupling between a blade and its handle, comprises balls resting partly in recesses formed in a plate secured to the handle and partly in recesses formed in the blade, relative movement of the handles causing the balls to ride partially out of the recesses and thereby generate a force in a direction normal to the direction of the relative movement to bias the blades towards one another. In another embodiment, a blade is rigid with a handle and carries a pivot on which the blade is pivoted. The blade is movable relative to the blade by a coupling comprising balls nesting in frusto-conical recesses in a plate and in the upper face of the blade, the plate having a shoulder engageable by a finger on a plate carried by a movable handle pivoted to the handle.

Document GB 431240 A discloses scissors, in which the cutting edges are forced together on the application of increased force at the handles during cutting.

BRIEF DESCRIPTION OF THE DISCLOSURE

An object of the present disclosure is to provide a shearing tool so as to provide an alternative way to improve the cutting capacity of a shearing tool.

The object of the disclosure is achieved by a shearing tool which is characterized by what is stated in the independent claim. The preferred embodiments of the disclosure are disclosed in the dependent claims.

The disclosure is based on the idea of providing a hand operated shearing tool, comprising a first unit comprising a first blade, the first blade comprising a first cutting edge; and a second unit comprising a second blade and a second handle connected to the second blade at a proximal end of the second blade, the second blade comprising a second cutting edge. The second unit is connected rotatably to the first unit about a first rotational axis defined by a first pivot, the first pivot comprising a first pin penetrating the first blade and the second blade. The first pin is connected to the first blade so that displacement of the first blade in relation to the first pin in a direction parallel with the first rotational axis is prevented. The second unit is arranged to be rotated in relation to the first unit about the first rotational axis between an open position of the shearing tool and a closed position of the shearing tool. The second handle is connected to the second blade so that rotational movement of the second handle in relation to the second blade about a second rotational axis is allowed. The second rotational axis is defined by a second pivot interacting with the second blade and the second handle and being arranged at a distance from the first rotational axis in a direction away from the cutting edge contact point. The first pin is arranged to penetrate the second handle through a through hole arranged in the second handle. The diameter of the through hole is greater than the diameter of the first pin for allowing movement of the second handle in relation to the second blade in a direction transversal to the first rotational axis. The through hole has a frusto-conical shape at the end of the through hole opening in the direction away from the second blade. The first pivot comprises a frusto-conical shape arranged coaxially with the first pin for interacting with the frusto-conical shape of the through hole. As a result, the second handle is arranged to exert a compressive force to the second blade due to a shearing force between the second handle and the second blade when the shearing tool is moved from the open position towards the closed position. Due to the compressive force, the second blade is driven towards the first blade at the cutting edge contact point for increasing the cutting capacity of the shearing tool.

An advantage of the shearing tool of the disclosure is that its structure is simple requiring only a few parts, resulting in easier manufacturing. It is also a more efficient way to increase the cutting capacity of a shearing tool.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1A:
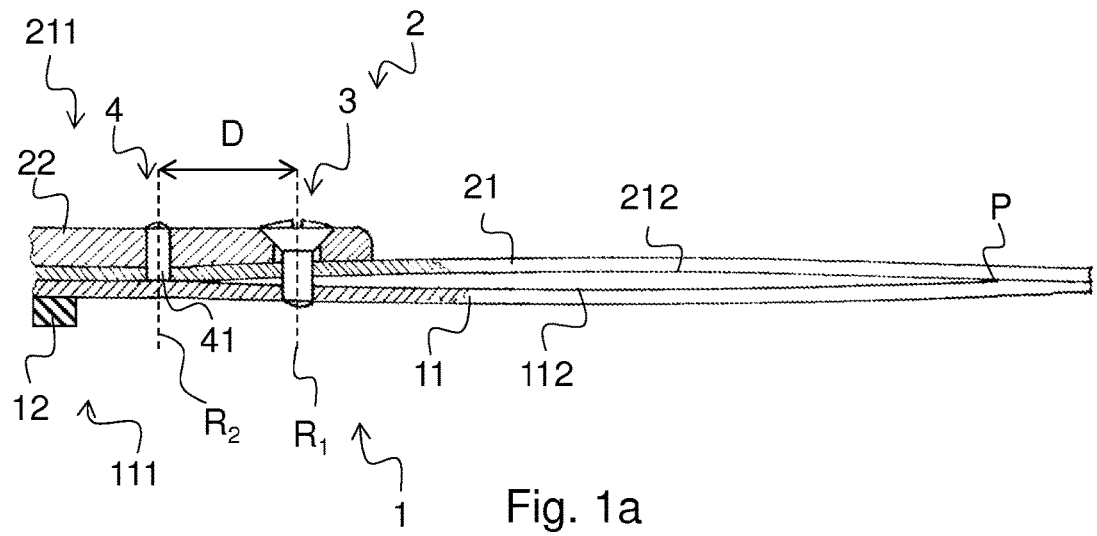
FIG. 1a is a schematic cross-sectional view of a hand operated shearing tool according to an embodiment of the disclosure in a relaxed state.

The disclosure relates to a hand operated shearing tool. For example, the hand operated shearing tool is a pair for scissors or a pair of shears, such as a pair of fabric scissors or sewing scissors, grass shears, hedge shears or plate shears.

The hand operated shearing tool comprises a first unit 1 comprising a first blade 11. The first blade 11 comprises a first cutting edge 112. Optionally the first unit 1 comprises also a first handle 12 fixed to the first blade 11 at a proximal end 111 of the first blade 11.

The hand operated shearing tool comprises a second unit 2 comprising a second blade 21 and a second handle 22 connected to the second blade 21 at a proximal end 211 of the second blade 21. The second blade 21 comprises a second cutting edge 212.

The second unit 2 is connected rotatably to the first unit 1 about a first rotational axis $R_1$ defined by a first pivot 3. The first pivot 3 comprises a first pin 31 penetrating the first blade 11 and the second blade 21. The first pin 31 is connected to the first blade 11 so that displacement of the first blade 11 in relation to the first pin 31 in a direction parallel with the first rotational axis $R_1$ is prevented. Preferably the first pin 31 is attached to the first blade 11. For example, the pivot 3 is formed by a screw that is screwed to a hole in the first blade 11. The second unit 2 is arranged to be rotated in relation to the first unit 1 about the first rotational axis $R_1$ between an open position of the shearing tool and a closed position of the shearing tool. In the open position, the first cutting edge 112 and the second cutting edge 212 are in an angle of at least 45°. In the closed position, the first blade 11 and the second blade 21 are essentially parallel.

At least one of the first blade 11 and the second blade 21 is curved and the first blade 11 and the second blade 21 are biased against each other so that the first cutting edge 112 and the second cutting edge 212 are in constant contact at a cutting edge contact point P when the hand operated shearing tool is moved between the open position and the closed position. The object to be cut is cut at the cutting edge contact point P. As the hand operated shearing tool is moved from the open position to the closed position, the cutting edge contact point P moves along the first cutting edge 112 and the second cutting edge 212. The first blade 11 and the second blade 21 exert a cutting edge force towards each other at the cutting edge contact point P. The cutting capacity of the shearing tool is directly proportional to the cutting edge force.

The proximal end 111 of the first blade 11 is located on one side of the first pivot 3 away from the cutting edge contact point P. The proximal end 211 of the second blade 21 is located on one side of the first pivot 3 away from the cutting edge contact point P.

Figure 1B:
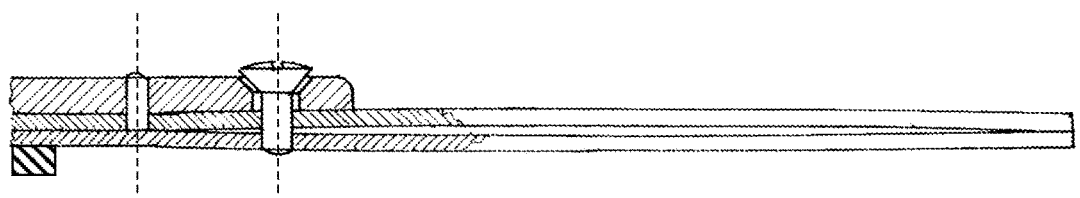
FIG. 1b is a schematic cross-sectional view of a hand operated shearing tool according to an embodiment of the disclosure in a state where there is a shearing force between the second blade and the second handle.
Figure 2A:
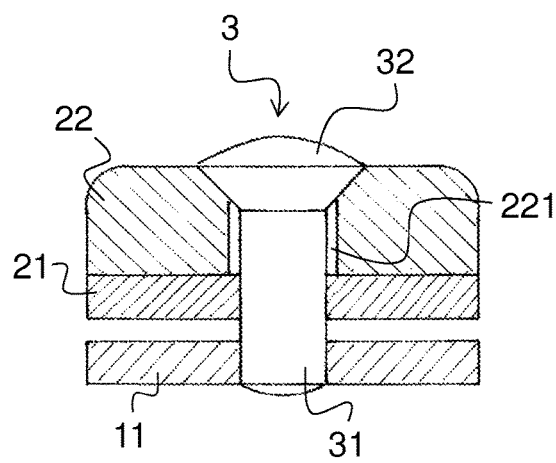
FIG. 2a is a schematic cross-sectional view of a part of a hand operated shearing tool according to an embodiment of the disclosure in a relaxed state.
Figure 2B:
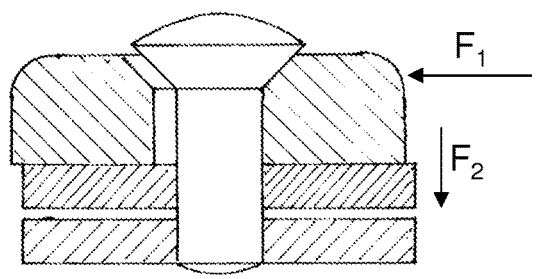
FIG. 2b is a schematic cross-sectional view of a part of a hand operated shearing tool according to an embodiment of the disclosure in a state where there is a shearing force between the second blade and the second handle.
Figure 7:
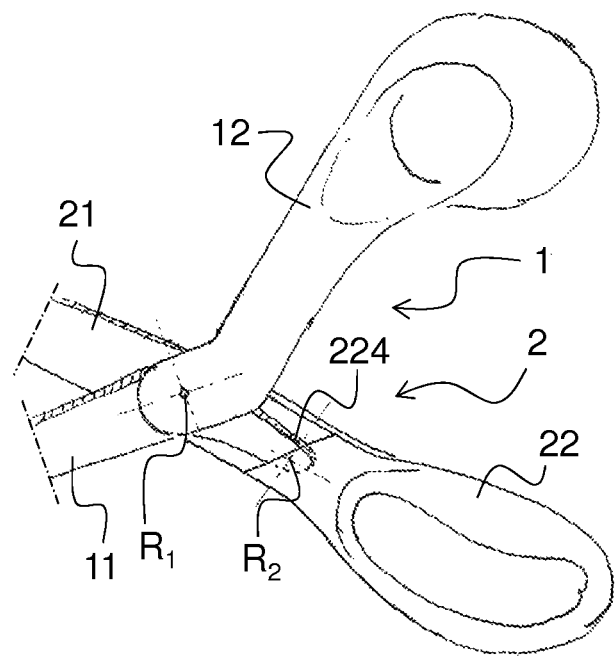
FIG. 7 is a schematic side view of a hand operated shearing tool according to an embodiment of the disclosure.

The second handle 22 is connected to the second blade 21 so that rotational movement of the second handle 22 in relation to the second blade 21 about a second rotational axis $R_2$ is allowed. The second rotational axis $R_2$ is defined by a second pivot 4 interacting with the second blade 21 and the second handle 22. According to an embodiment, the second pivot 4 comprises a second pin 41 penetrating the second blade 21 and the second handle 222, as illustrated in FIGS. 1 and 2. According to an alternative embodiment, the proximal end 211 of the second blade 21 is nested in a slot 224 arranged in the second handle 22, and the rotation of the second handle 22 in relation to the second blade 21 is provided by the slot 224, i.e. the slot acts as the second pivot 4, as illustrated in FIG. 7. The second rotational axis $R_2$ is arranged at a distance D from the first rotational axis $R_1$ in a direction away from the cutting edge contact point P. According to an embodiment of the disclosure, the distance D between the first rotational axis $R_1$ and the second rotational axis $R_2$ is 15 to 45 mm, preferably 20 to 30 mm. This is to provide optimal torsional moment for the shearing tool.

Figure 4:
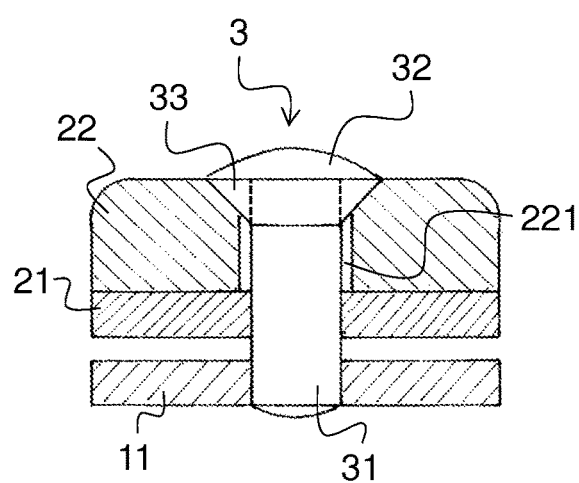
FIG. 4 is a schematic cross-sectional view of a part of a hand operated shearing tool according to an embodiment of the disclosure in a relaxed state.

The first pin 31 is arranged to penetrate the second handle 22 through a through hole 221 arranged in the second handle 22. The diameter of the through hole 221 is greater than the diameter of the first pin 31 for allowing movement of the second handle 22 in relation to the second blade 21 in a direction transversal to the first rotational axis $R_1$. The through hole 221 has a frusto-conical shape at the end of the through hole 221 opening in the direction away from the second blade 21. In other words, the diameter of the through hole 221 increases towards the end of the through hole that is in the direction away from the second blade 221. For example, the angle of the frusto-conical shape of the through hole 221 is 40° to 50°, preferably 42° to 48°, more preferably 45°. The first pivot 3 comprises a frusto-conical shape arranged coaxially with the first pin for interacting with the frusto-conical shape of the through hole 221. In other words, the diameter of the first pivot 3 increases in the direction away from the second handle 22. According to an embodiment, the frusto-conical shape of the first pivot 3 is integral with the head 32. According to an alternative embodiment, the frusto-conical shape of the first pivot 3 is provided by a frusto-conical washer 33 arranged coaxially with the first pin 3, as illustrated in FIG. 4. For example, the angle of the frusto-conical shape of the first pivot 3 is 40° to 50°, preferably 42° to 48°, more preferably 45°. Preferably, the angle of the frusto-conical shape of the through hole 221 and the angle of the frusto-conical shape of the first pivot 3 correspond to each other. If the angle is too small, the friction between the parts becomes too high. The friction can be reduced by using lubricant between the first pivot 3 and the second handle 22. If the angle is too large, the operation of the shearing tool is less efficient.

Figure 3A:
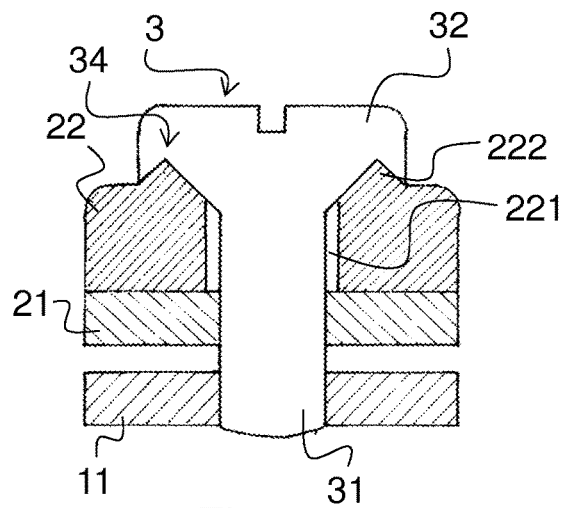
FIG. 3a is a schematic cross-sectional view of a part of a hand operated shearing tool according to an embodiment of the disclosure in a relaxed state.
Figure 3B:
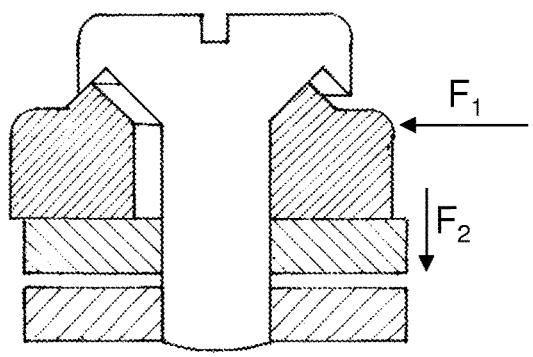
FIG. 3b is a schematic cross-sectional view of a part of a hand operated shearing tool according to an embodiment of the disclosure in a state where there is a shearing force between the second blade and the second handle.

According to an embodiment of the disclosure, the second handle 22 comprises a frusto-conical shape arranged coaxially with the through hole 221 at the opposite side of the second handle 22 in relation to the second blade 21 for forming, together with the frusto-conical shape of the through hole 221, an annular protrusion 222. The formed annular protrusion 222 has an annular ridge where the frusto-conical shape of the through hole 221 and the frusto-conical shape of the second handle 22 meet. For example, the angle of the ridge of the annular protrusion 222 is 80° to 100°, preferably 84° to 96°, more preferably 90°. The first pivot 3 comprises an annular groove 34 arranged coaxially with the first pin 31 and corresponding to the shape of the annular protrusion 222 for receiving the annular protrusion 222 in the annular groove 34. In other words, the annular groove 34 is formed by two coaxial frusto-conical sections, the outer of which is inverted. This embodiment has been illustrated in FIGS. 3a and 3b. This embodiment prevents the first pivot 3 from tilting by distributing the forces on both sides of the centre line of the pivot 3 and thus increases the efficiency of the shearing tool.

Figure 5:
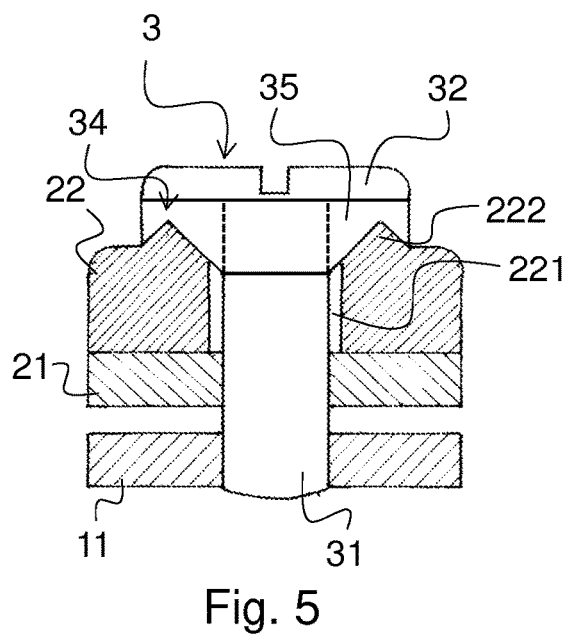
FIG. 5 is a schematic cross-sectional view of a part of a hand operated shearing tool according to an embodiment of the disclosure in a relaxed state.
Figure 6:
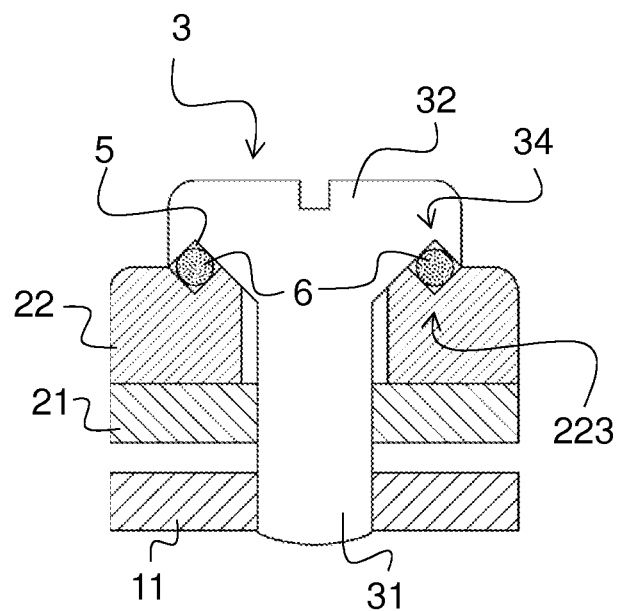
FIG. 6 is a schematic cross-sectional view of a part of a hand operated shearing tool according to an embodiment of the disclosure in a relaxed state.

According to an alternative embodiment of the disclosure, the second handle 22 comprises an annular groove 223 arranged coaxially with the through hole 221 at the opposite side of the second handle 22 in relation to the second blade 21, and the first pivot 3 comprises an annular groove 34 arranged coaxially with the first pin 31. The annular groove 223 of the second handle 22 and the annular groove 34 of the first pivot 3 are formed by two coaxial frusto-conical sections, the outer of which is inverted. According to an embodiment, the annular groove 34 of the first pivot 3 is integral with the head 32. According to an alternative embodiment, the annular groove 34 of the first pivot 3 is provided by a washer 35 arranged coaxially with the first pin 31, as illustrated in FIG. 5. For example, the angle between the side walls of the annular groove 223 of the second handle 22 is 80° to 100°, preferably 84° to 96°, more preferably 90°. For example, the angle between the side walls the annular groove 34 of the first pivot 3 is 80° to 100°, preferably 84° to 96°, more preferably 90°. Preferably, the angle between the side walls of the annular groove 223 of the second handle 22 and the angle between the side walls the annular groove 34 of the first pivot 3 correspond to each other. The annular groove 223 of the second handle 22 and the annular groove 34 of the first pivot 3 form an annular space 5. The hand operated shearing tool comprises bearing balls 6 arranged in the annular space 5. This embodiment prevents the first pivot 3 from tilting by distributing the forces on both sides of the centre line of the pivot 3, and reduces friction between the pivot 3 and the second handle 22, and thus increases the efficiency of the shearing tool even further.

The second handle 22 is arranged to exert a compressive force $F_2$ to the second blade 21 due to a shearing force $F_1$ between the second handle 22 and the second blade 21 when the shearing tool is moved from the open position towards the closed position. In other words, the frusto-conical shape of the through hole 221 and the first pivot 3, the shearing force $F_1$ between the second handle 22 and the second blade 21 is converted into the compressive force $F_2$. Due to the compressive force $F_1$, the second blade 21 is driven towards the first blade 11 at the cutting edge contact point P for increasing the cutting capacity of the shearing tool.

The invention claimed is:

1. A hand operated shearing tool, comprising:
   a first unit comprising a first blade, the first blade comprising a first cutting edge; and
   a second unit comprising a second blade and a handle engaged with the second blade at a proximal end of the second blade, the second blade comprising a second cutting edge, wherein:
   the second unit is connected rotatably to the first unit about a first rotational axis defined by a first pivot, the first pivot comprising a first pin penetrating the first blade and the second blade;
   the first pin is connected to the first blade so that displacement of the first blade in relation to the first pin in a direction parallel with the first rotational axis is prevented;
   the second unit is arranged to be rotated in relation to the first unit about the first rotational axis between an open position of the shearing tool and a closed position of the shearing tool;
   at least one of the first blade and the second blade is curved and the first blade and the second blade are biased against each other so that the first cutting edge and the second cutting edge are in constant contact at a cutting edge contact point when the hand operated shearing tool is moved between the open position and the closed position,
   the handle is connected to the second blade so that rotational movement of the handle in relation to the second blade about a second rotational axis is allowed;
   the second rotational axis is defined by a second pivot interacting with the second blade and the handle and being arranged at a distance from the first rotational axis in a direction away from the cutting edge contact point;
   the first pin is arranged to penetrate the handle through a through hole arranged in the handle;
   a diameter of the through hole is greater than a diameter of the first pin for allowing movement of the handle in relation to the second blade in a direction transversal to the first rotational axis;
   the through hole has a frusto-conical shape at the end of the through hole opening in a direction away from the second blade;
   the first pivot comprises a frusto-conical shape arranged coaxially with the first pin for interacting with the frusto-conical shape of the through hole;
   as a result, the handle is arranged to exert a compressive force to the second blade due to a shearing force between the handle and the second blade when the shearing tool is moved from the open position towards the closed position; and
   due to the compressive force, the second blade is driven towards the first blade at the cutting edge contact point for increasing the cutting capacity of the shearing tool.

2. A hand operated shearing tool according to claim 1, wherein the distance between the first rotational axis and the second rotational axis is 15 to 45 mm.

3. A hand operated shearing tool according to claim 1, wherein the angle of the frusto-conical shape of the through hole and the frusto-conical shape of the first pivot is 40° to 50° relative to first rotational axis.

4. A hand operated shearing tool according to claim 1, wherein the first pivot comprises a head and the head defines the first pivot frusto-conical shape.

5. A hand operated shearing tool according to claim 1, wherein the first pivot comprises a frusto-conical washer and the washer defines the first pivot frusto-conical shape.

6. A hand operated shearing tool according to claim 1, wherein the handle comprises a frusto-conical shape arranged coaxially with the through hole at an opposing side of the handle to a side thereof engaged with the second blade, where the frusto-conical shape of the through hole and frusto-conical shape on the handle together define an annular protrusion; and
   the first pivot comprises an annular groove arranged coaxially with the first pin and corresponding to the shape of the annular protrusion for receiving the annular protrusion in the annular groove.

7. A hand operated shearing tool according to claim 6, wherein the first pivot point comprises a head and the head defines the pivot annular groove.

8. A hand operated shearing tool according to claim 6, wherein the first pivot comprises a washer arranged coaxially with the first pin and the washer defines the first pivot annular groove.

9. A hand operated shearing tool according to claim 1, wherein the handle comprises an annular groove arranged coaxially with the through hole at the opposing side of the handle to a side thereof engaged with the second blade;
- the first pivot comprises an annular groove arranged coaxially with the first pin;
- the annular groove of the handle and the annular groove of the first pivot form an annular space; and
- the hand operated shearing tool comprises bearing balls arranged in the annular space.

10. A hand operated shearing tool according to claim 9, wherein an angle between side walls of the annular groove of the handle and an angle between side walls the annular groove of the first pivot is 80° to 100°.

11. A hand operated shearing tool according to claim 1, wherein the second pivot comprises a second pin penetrating the second blade and the handle.

12. A hand operated shearing tool according to claim 1, comprising a second handle, the second handle fixed to the first blade at a proximal end of the first blade.

* * * * *